United States Patent
Keane et al.

(10) Patent No.: US 10,348,577 B2
(45) Date of Patent: Jul. 9, 2019

(54) DISCOVERING AND MONITORING SERVER CLUSTERS

(71) Applicant: Microsoft Technology Licensing, LLC, Redmond, WA (US)

(72) Inventors: Thomas W. Keane, Seattle, WA (US); Vladimir Joanovic, Oakville (CA); Ferit Findik, Sammamish, WA (US); Vitaly Voloshin, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 169 days.

(21) Appl. No.: 15/069,343

(22) Filed: Mar. 14, 2016

(65) Prior Publication Data

US 2016/0197795 A1    Jul. 7, 2016

Related U.S. Application Data

(63) Continuation of application No. 11/068,504, filed on Feb. 28, 2005, now Pat. No. 9,319,282.

(51) Int. Cl.
*G06F 11/14* (2006.01)
*H04L 12/24* (2006.01)
*H04L 29/08* (2006.01)
*H04L 29/06* (2006.01)

(52) U.S. Cl.
CPC ...... *H04L 41/5012* (2013.01); *H04L 41/0663* (2013.01); *H04L 67/1002* (2013.01); *H04L 67/1008* (2013.01); *H04L 67/1029* (2013.01); *H04L 67/16* (2013.01); *H04L 67/2852* (2013.01); *H04L 67/42* (2013.01); *G06F 11/1451* (2013.01)

(58) Field of Classification Search
CPC .................................................. G06F 11/1451
USPC ...................................... 707/201, 640; 714/4
See application file for complete search history.

(56) References Cited

U.S. PATENT DOCUMENTS

| | | | |
|---|---|---|---|
| 5,544,319 A * | 8/1996 | Acton | G06F 12/0292 709/246 |
| 6,728,748 B1 * | 4/2004 | Mangipudi | H04L 41/5009 709/226 |
| 6,754,855 B1 * | 6/2004 | Denninghoff | G06F 9/4406 714/25 |
| 6,839,740 B1 | 1/2005 | Kiselev | |
| 6,868,442 B1 | 3/2005 | Burdeau | |
| 6,941,384 B1 | 9/2005 | Aiken, Jr. et al. | |
| 7,213,246 B1 | 5/2007 | van Rietschote et al. | |
| 8,185,776 B1 * | 5/2012 | Gentes | G06F 11/1438 709/223 |

(Continued)

OTHER PUBLICATIONS

Notice of Allowance Issued in U.S. Appl. No. 11/068,504, dated Dec. 14, 2015, 5 Pages.
Final Office Action Issued in U.S. Appl. No. 11/068,504, dated Dec. 18, 2008, 13 Pages.
Non Final Office Action Issued in U.S. Appl. No. 11/068,504, dated Mar. 18, 2008, 15 Pages.

(Continued)

*Primary Examiner* — Syling Yen
(74) *Attorney, Agent, or Firm* — Workman Nydegger

(57) ABSTRACT

In a server cluster, multiple nodes may host one or more virtual servers. Virtual servers that may be hosted by particular nodes are identified. From the nodes, status is provided as to nodes that are actively hosting virtual servers and status of nodes whether they are actively hosting or not hosting a virtual server. Failover events are indicated, including transition of a virtual server from a failed node to another node.

20 Claims, 7 Drawing Sheets

(56) References Cited

U.S. PATENT DOCUMENTS

| | | | |
|---|---|---|---|
| 2002/0112069 A1 | 8/2002 | Sim | |
| 2003/0014524 A1 | 1/2003 | Tormasov | |
| 2003/0018927 A1 | 1/2003 | Gadir et al. | |
| 2003/0172305 A1 | 9/2003 | Miwa | |
| 2004/0098490 A1 | 5/2004 | Dinker et al. | |
| 2004/0158766 A1* | 8/2004 | Liccione | G06F 11/2023 714/4.11 |
| 2004/0243650 A1* | 12/2004 | McCrory | G06F 9/5061 |
| 2005/0108593 A1 | 5/2005 | Purushothaman et al. | |
| 2005/0210074 A1 | 9/2005 | Nakatani et al. | |
| 2005/0228947 A1* | 10/2005 | Morita | G06F 11/2046 711/114 |
| 2006/0031478 A1* | 2/2006 | Gopalkrishnan | G06F 11/3409 709/224 |
| 2006/0129667 A1 | 6/2006 | Anderson | |
| 2006/0155912 A1 | 7/2006 | Singh et al. | |

OTHER PUBLICATIONS

Final Office Action Issued in U.S. Appl. No. 11/068,504, dated Mar. 5, 2010, 41 Pages.

Final Office Action Issued in U.S. Appl. No. 11/068,504, dated Mar. 9, 2011, 38 Pages.

Non Final Office Action Issued in U.S. Appl. No. 11/068,504, dated Jun. 13, 2007, 11 Pages.

Non Final Office Action Issued in U.S. Appl. No. 11/068,504, dated Jul. 27, 2010, 32 Pages.

Non Final Office Action Issued in U.S. Appl. No. 11/068,504, dated Sep. 3, 2009, 29 Pages.

Office Action for U.S. Appl. No. 11/068,504, dated Mar. 5, 2012, Thomas W. Keane, "Discovering and Monitoring Server Clusters", 31 pgs.

Non-Final Office Action for U.S. Appl. No. 11/068,504, dated Sep. 28, 2011, Thomas Keane, "Discovering And Monitoring Server Clusters", 24 pages.

* cited by examiner

DISCOVERING AND MONITORING SERVER CLUSTERS

CROSS-REFERENCE TO RELATED APPLICATIONS

This application is a continuation of U.S. patent application Ser. No. 11/068,504, filed on Feb. 28, 2005, which is incorporated by reference herein in its entirety.

TECHNICAL FIELD

This invention relates to discovering and monitoring server clusters, and particularly identifying and monitoring physical computers and virtual servers that make up server clusters.

BACKGROUND

Software applications or application programs may be provided to client computers (users) through a technique known as server clustering. A server cluster is a group of independent physical computers also known as nodes. The nodes work together as a single system in combination with a shared disk to ensure that the application programs remain available to the client computers in the event that one of the nodes fails. The nodes run a common operating system and allow administrators to access and manage the nodes as a single system rather than as separate computers.

Typically, a server cluster relies on the most expensive or most technologically advanced hardware in the datacenter. This server cluster may be hosting or running the most important software application. Because of the importance of the cluster, administrators desire to manage it better than other computers in a datacenter.

Client computers interact with the server cluster through a virtual server. The virtual server is not a physical computer, but is created and hosted by one of the physical computers or nodes in the server cluster. The virtual server may be identified by client computers through an IP (internet protocol) address or by a server name. In the event of failure or failover of a host node, the virtual server may move or be relocated to another node in the server cluster. The virtual server may also be relocated from one node to another node during maintenance by administrators.

Typically, a monitoring system is employed by the server cluster by installing management agents on each node. Through the management agents, each node is monitored by a management system server. A management agent communicates on a regular basis with the management system server. The management system server deploys management packs which contain rules and other logic for monitoring the health of the nodes. In addition to monitoring the health of the node, the management agent may host the management pack and identify the makeup (i.e., configuration) of the node.

To effectively monitor the server cluster, the monitoring system determines which virtual servers exist in the server cluster. Once the monitoring system determines which virtual servers exist in the server cluster, it determines which nodes may host particular virtual servers. This determining allows that at any particular instance, the monitoring system can determine which particular node is currently hosting a particular virtual server.

Typically, a monitoring system may be able to understand when failover occurs; however, the monitoring system may not understand the consequence of a particular failover. In certain cases, the monitoring system may provide false or misleading information. For example, the monitoring system may provide an erroneous warning to an administrator that a virtual server with which client computers are interacting has become disabled when in fact the host node has failed. However, although the hosting node has failed, failover nodes are available that can host the virtual server and continue to allow client computers to use application programs provided through the virtual server. The monitoring system may not provide information that administrative action is required on the failed node and alert the administrator of such a failure.

Furthermore, the typical monitoring system may fail to effectively address the following issues in order to monitor the server cluster: what virtual servers exist in the server cluster; which particular nodes may host which particular virtual server; what are active virtual servers; which node is currently hosting which virtual server; and which nodes have historically hosted which virtual servers.

Cluster logic that includes complex script or code may be written or provided in management packs to address some of the issues. The script or code is ran and evaluated on a node to determine if the node is hosting a virtual server. As the script or code runs, a determination is made as to whether a virtual server is hosting a server cluster (i.e., providing software applications to client computers). However, such cluster logic and script may have to be continuously modified and distributed from a central authority or administrator, to provide adequate determination and monitoring of nodes and virtual servers. In other words, typical monitoring systems rely on a central authority or administrator.

Therefore, without the complex cluster logic that includes the script from the central authority or administrator, typical monitoring systems do not adequately detect or identify all server clusters, track nodes that host virtual servers, or track virtual servers. If virtual servers and nodes are not identified, they cannot be monitored.

SUMMARY

Nodes in a server cluster host one or more virtual servers. The nodes identify which virtual servers they are able to host, receive approval to host one or more virtual servers, indicate which particular virtual servers that are actively hosted, and monitor the status of other nodes in the server cluster. Furthermore, the status of virtual servers and nodes in the server cluster are monitored and updated, including failover events when a node fails and the virtual server is transitioned to another node.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes techniques in which server clusters, nodes of server clusters, and virtual servers of server clusters are identified and monitored.

Figure 1:
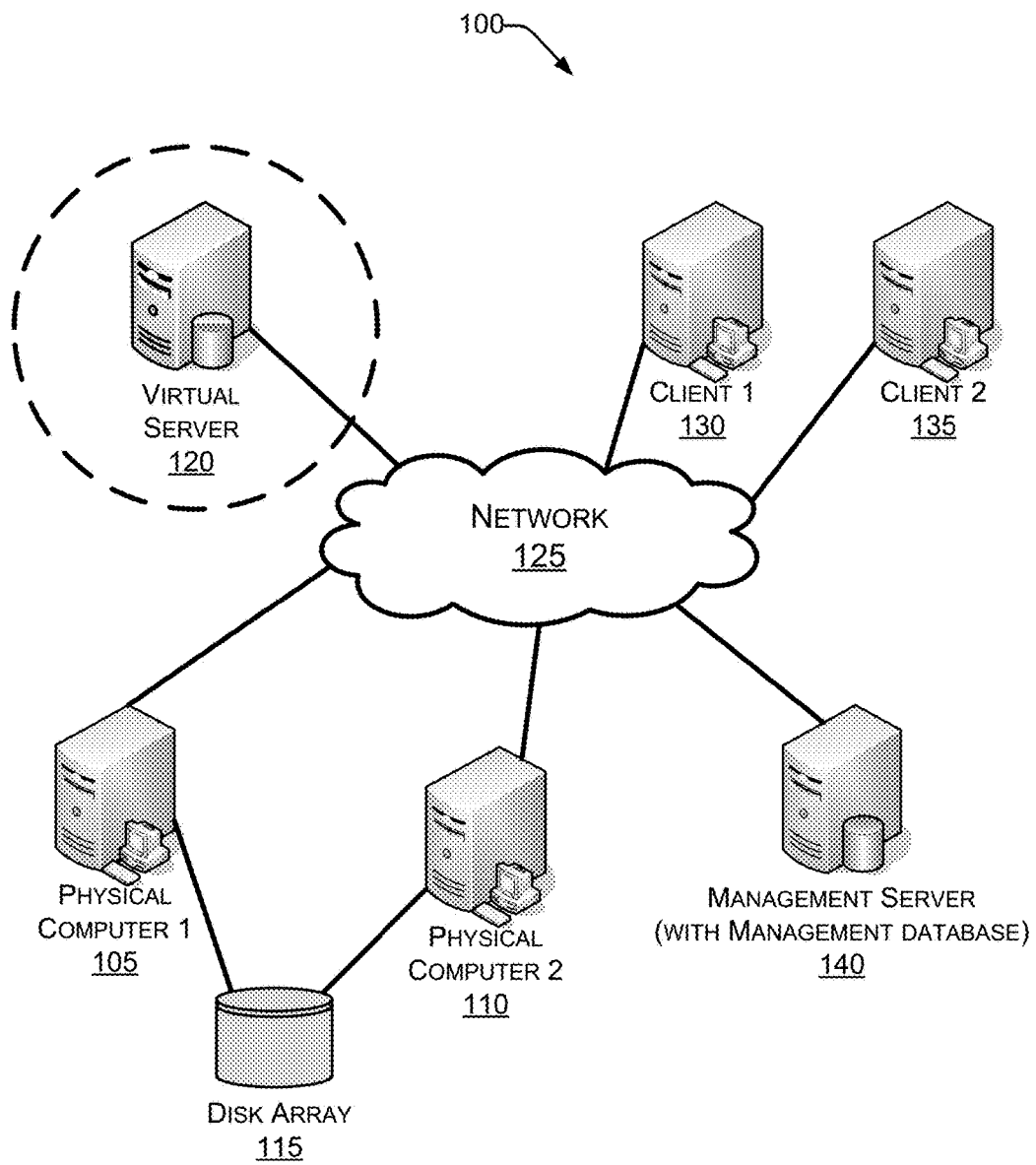
FIG. 1 is an illustration of a system that discovers and monitors server clusters.

FIG. 1 shows a system that identifies and monitors server clusters. System 100 includes one or more physical computers or nodes such as "physical computer 1" 105 and "physical computer 2" 110 that are shown. Physical computers 105 and 110 may share a disk storage or disk array 115. Monitoring system agents are installed in physical computers 105 and 110 to particularly provide monitoring and alerts as to the condition and health of physical computers 105 and 110. Furthermore, as discussed below, such monitoring system agents provide the ability to identify and monitor nodes and virtual servers.

Nodes or physical computers 105 and 110 provide one or more software applications or application programs. As part of a server cluster, physical computers 105 and 110 may host one or more virtual servers such as virtual server 120. Physical computers 105 and 110 which are referred to as nodes, along with virtual server 120 make up a server cluster. Virtual server 120 may provide one of various functions such as email, database, etc. In this example, as server cluster virtual server 120 provides such functions through application programs that are provided or hosted by physical computers 105 and 110.

A network 125 connects physical computers 105 and 110. The network 125 allows access to virtual server 120 by physical computers 105 and 110. Network 125 may include one or more networks such as the Internet, local area networks, wide area networks, wired networks.

In this example, network 125 also allows access to virtual server 120 by client computers such as "client computer 1" 130 and "client computer 2" 135. Client computers 130 and 135 may recognize and access (i.e., communicate with) virtual computer 120 by an IP (internet protocol) address or server name. Interaction of client computers 130 and 135 is through virtual server 120, although data and application programs may be stored in and sent from nodes or physical computers 105 and 110.

A management server 140 provides monitoring system agents to nodes such as physical computers 105 and 110. Updates for the monitoring system agents may also be provided by the management server 140. Management server 140 may include a management database of monitoring rules and configuration data that are sent to server cluster nodes (e.g., physical computers 105 and 110). The management database may also store relationships between nodes (e.g., physical computers 105 and 110) and virtual servers (e.g., virtual server 120). In particular, the relationships describe which nodes may host which particular virtual servers. Management server 140 may include an administration console that allows an administrator to monitor server clusters, virtual servers, and nodes. The administration console provides an interface to monitor tasks ran through nodes and virtual servers and receive diagnostics from the nodes and virtual servers.

Figure 2:
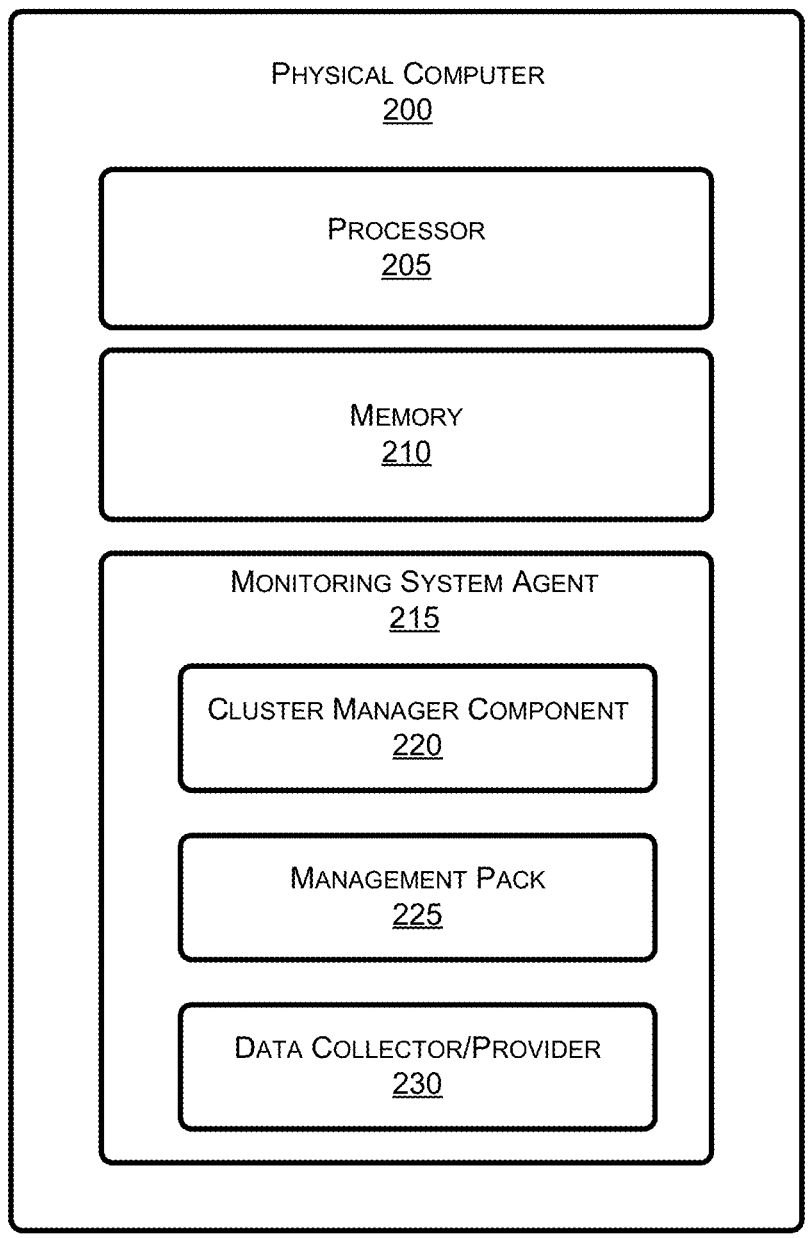
FIG. 2 is a block diagram of a node or physical computer that identifies and monitors the physical computer and virtual servers that may be hosted by the physical computer.

FIG. 2 shows an exemplary node or physical computer. Physical computer 200 includes nodes or physical computers 105 and 110 described above. Physical computer 200 includes a central processing unit (CPU) or processor 205 and a memory 200. Processor 205 accesses memory 210 through a system bus (not shown). The memory 205 may store a monitoring system agent that is accessed and controlled by processor 205; however, in this example, a monitoring system agent 215 resides separately from memory 210.

Physical computer 200 may receive monitoring system agent 215 and updates to monitoring system agent 215 from a separate computer such as management server 140 described above. Monitoring system agent 215 includes a cluster management component 220. Cluster management component 220 is responsible for server cluster monitoring. In specific, the cluster management component 220 performs two roles in support of server cluster monitoring. The first role is to discover virtual servers that the physical computer 200 as a node may host. The second role is to keep track of the status of these virtual servers and track when a virtual server is actively being hosted by physical computer 200 or no longer being actively hosted by physical computer 200. Based on the status of a virtual server hosted by physical computer 200, the cluster management component 220 will actively begin or stop deploying a cache of rules for monitoring.

The cache of rules for monitoring may be included in a management pack 225. The rules for monitoring might, for example, include frequency that the node checks the status of the virtual server(s); frequency of the number of times the node provides updates to an administrator as to the status of the virtual server(s); conditions that the virtual server is to look for in a virtual server(s); and identification of particular nodes or virtual servers to be monitored (i.e., nodes that are actively hosting virtual servers).

The management pack 225 is hosted as part of the monitoring system agent. The management pack 225 and updates to management pack 225 (i.e., updates to the cache of rules for monitoring) may be received from a separate computer such as management server 140. Physical computer 200 deploys the rules in management pack 225 when physical computer 200, as a node in the server cluster, begins hosting a virtual server.

Physical computer 200, and any node in a server cluster, listens for or monitors changes in hosting of virtual servers (i.e., failovers of nodes and transition of nodes that hosts a virtual server). In this example, monitoring system agent 215 includes a data collector/provider 230 that acts as a listener and agent that monitors changes in the hosting of virtual servers, including changes in the status of physical computer 200 as a host node to a virtual server. In other embodiments, cluster management component 220 includes or performs the functions of data collector/provider 230. In specific, data collector/provider 230 receives status of other nodes as to hosting of virtual servers; receives status of virtual servers; and provides status as to physical computer 200 hosting a virtual server.

Figure 3:
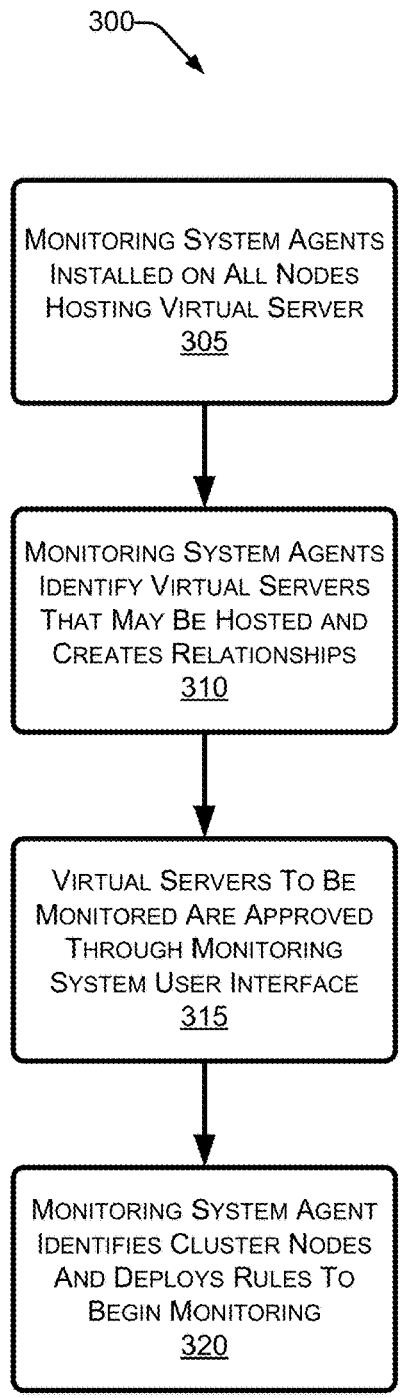
FIG. 3 is a flow diagram illustrating a process for monitoring a virtual server by nodes and an administrator of a server cluster.

FIG. 3 shows a process 300 to monitor a virtual server. The process 300 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 300 is described with reference to physical computer 200 described above. Although described as a flowchart, it is contemplated that certain processes may take place concurrently or in a different order.

At block 305, as a node in a server cluster, a physical computer receives and installs a monitoring system agent. The installation of the monitoring system agent may be requested by an administrator/user from another server such as management server 140. Each of the nodes of the server cluster that may host a virtual server is provided with a monitoring system agent.

At block 310, the installed monitoring agent identifies the virtual servers that may be hosted by the physical computer (i.e., node). Certain physical computers may include specific application programs that support (i.e., can host) particular virtual servers. The identification of particular virtual servers is made available to the administrator/user and other physical computers (i.e., nodes).

At block 315, active virtual servers are identified to the administrator/user through the monitoring system agents installed in the physical computers or nodes of the server cluster. The active virtual servers are approved by the administrator/user for monitoring through a monitoring system user interface. Through the monitoring system agent, each of the nodes is identified as either hosting or not hosting a virtual server. If a node in the server cluster is hosting the virtual server, the node begins to monitor the entire server cluster. If a node is not hosting the virtual server, the node does not monitor the server cluster; however, the node does monitor failover events (i.e., failure of the hosting node).

At block 320, a cache of monitoring rules is sent to each of the nodes in the server cluster. As described above, the cache of rules may be sent in the form of a management pack or an update to a management pack included in a monitoring system agent of a node. The cache of monitoring rules includes identification of particular nodes that are actively hosting particular virtual servers. Once the cache of rules are received by each of the nodes in the server cluster, nodes actively hosting virtual server(s) begin monitoring the server cluster, while nodes that are not actively hosting virtual server(s) receive information as to status of the server cluster.

Figure 4:
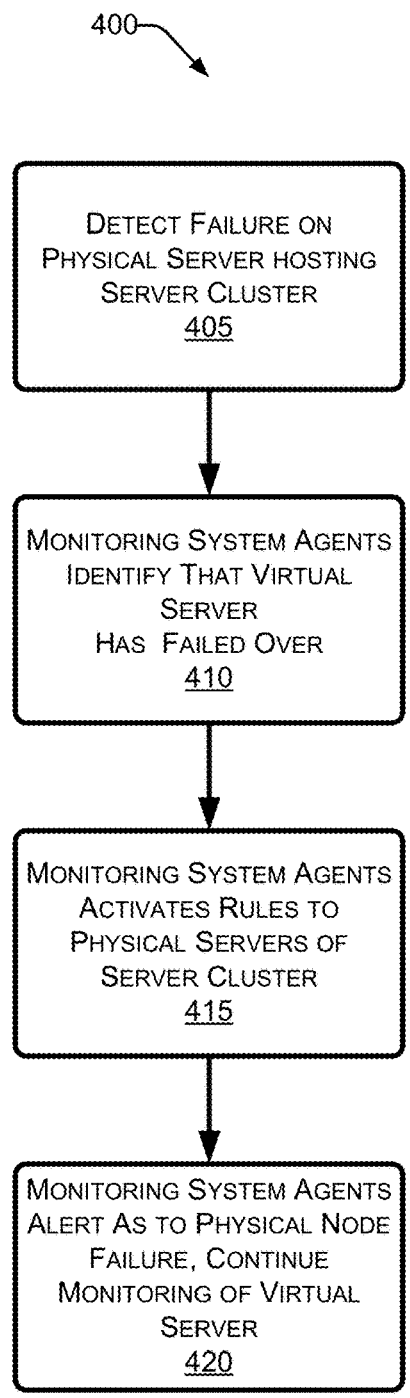
FIG. 4 is a flow diagram illustrating a process for monitoring failure in a virtual server by nodes and an administrator of a server cluster.

FIG. 4 shows a process 400 to monitor failures in a virtual server. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 400 is described with reference to physical computer 200 described above. Although described as a flowchart, it is contemplated that certain processes may take place concurrently or in a different order.

At block 405, a failure of a node occurs. At the time of failure, the node was active in hosting a virtual server. A notice of failure is particularly provided to an administrator/user of the server cluster. In certain cases, the node is part of a server cluster that includes more than one virtual server. For example, the server cluster may include a virtual server that provides specific database functionality, and also includes another virtual server that provides specific email functionality. In this example, the failed node hosts one of the virtual servers (e.g., database functionality) while another node hosts the other virtual server.

At block 410, failover of the virtual server is identified. Failover of the virtual server is detected and identified by other nodes in the server cluster, and particularly by nodes that are able to host the virtual server. In other words, inactive nodes that may host a virtual server, through monitoring system agents in each of the nodes, identifies when a virtual host in an active node has failed. Furthermore, an indication may be provided that the failover includes a transition from the failed node to another node that hosts the virtual server. The administrator/user receives an indication that a node has failed; however, failover successfully transitioned the virtual server to another node. In the event that failover did not successfully transition the virtual server to another node the administrator is notified of the failure. Therefore, no false indication is provided as to a failed virtual server. Furthermore, in the event that the server cluster includes a second (or more) virtual server(s) that provides different functionality hosted by a different node, the failure of the node hosting the first virtual server that provides different functionality does not affect (i.e., does not provide false alerts) as to the other nodes supporting the second virtual server.

At block 415, the cache of monitoring rules is activated at the particular nodes of the affected virtual server. The particular nodes include the node that failed, the node that the failover transition took place that currently hosts the virtual server, and any nodes that may host the virtual server. The cache of monitoring rules provides the ability to identify the node that hosts the virtual server to the other nodes and to the administrator/user. The cluster manager is a watcher, and determines if the cache of monitoring rule should be activated or remain inactive.

At block 420, the monitoring system agent of the nodes activates the cache of monitoring rules. The node in which the virtual server is hosted monitors the entire server cluster including the virtual server, and nodes that are not actively hosting the virtual server monitor the node hosting the virtual server.

Figure 5:
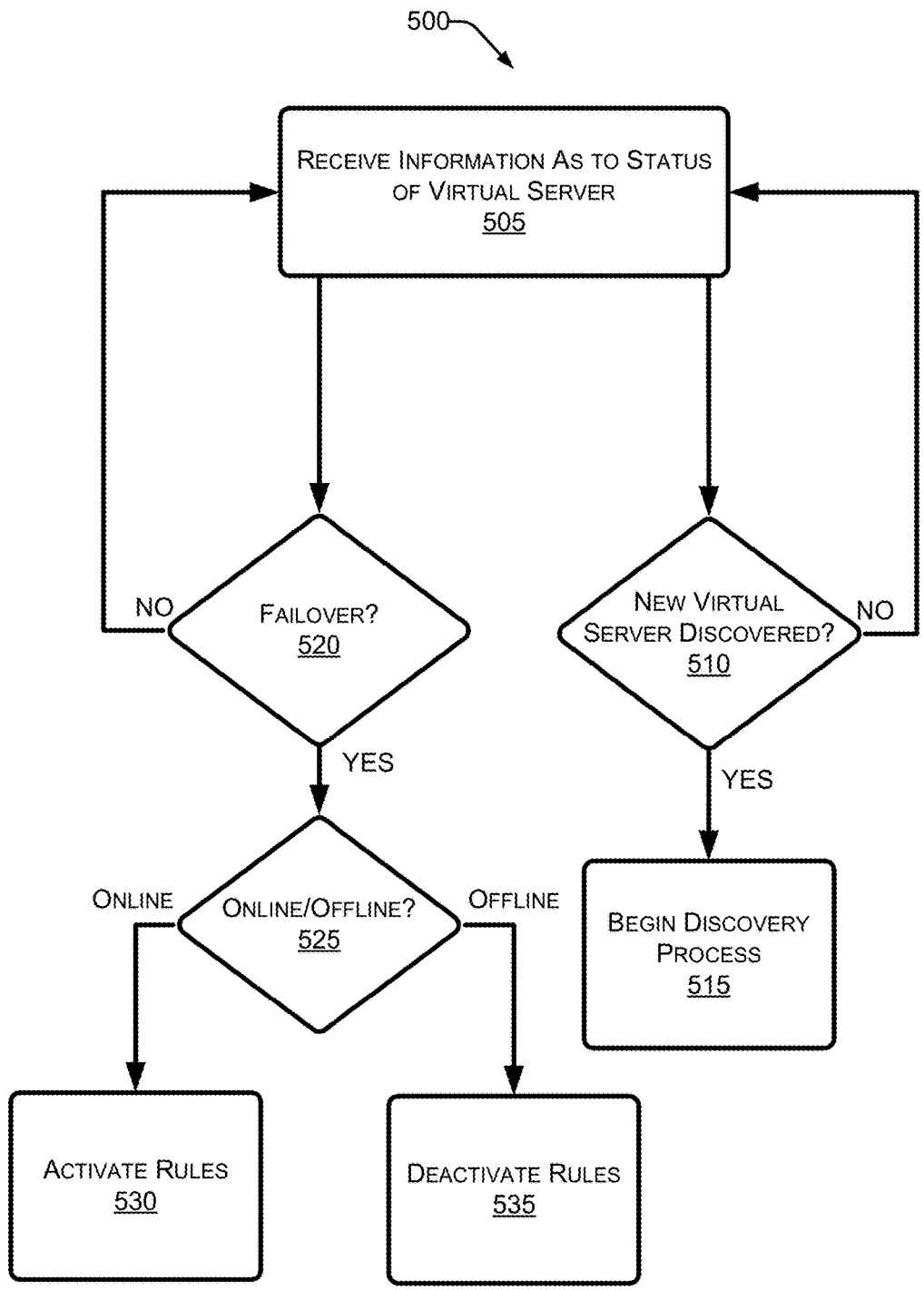
FIG. 5 is a flow diagram illustrating a process for monitoring of server clusters.

FIG. 5 shows a process 500 to monitor server clusters. The process 500 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 500 is described with reference to physical computer 200 described above. Although described as a flowchart, it is contemplated that certain processes may take place concurrently or in a different order.

At block 505, a monitoring system agent, and specifically a cluster management component of a monitoring system agent as described above, listens or gathers data as to status of virtual servers of the server cluster.

In specific, monitoring system agents look for or discover virtual servers to be hosted by physical computers, if a virtual server is discovered (i.e., following the YES branch of block 510), block 515 is performed. At block 515, the discovery process includes identifying relationships between each of the physical computers or nodes of the server cluster and the virtual server. In specific, the relationships define which node hosts the virtual server and which nodes do not host the virtual server. The relationships may be stored in a management database accessed by another computer such as management server 140 described above. Virtual servers may be approved or disapproved (non-approved) by an administrator/user. Approved virtual servers allow hosting nodes to receive rules and configuration data, while non-approved virtual servers do not allow hosting nodes to receive such rules and configuration data.

Monitoring system agents also identify failover situations that occur in the server cluster. As discussed above, failover occurs when a physical computer or node hosting a virtual server fails and a transition to host the virtual server is made to another node in the server cluster. If a failover is identified (i.e., following the YES branch of block 520), a determination is made as to whether the server cluster is online or offline. If the server cluster is online, client computers or users are actively receiving data or using application programs from the virtual server of the server cluster.

If the server cluster is online (i.e., following the ONLINE branch of block 525), at block 530 rules and configuration data as to monitoring nodes and virtual servers are activated by respective active and inactive nodes of the server cluster.

If the server cluster is offline (i.e., following the OFFLINE branch of block 525), at block 535 rules and configuration data as to monitoring nodes and virtual servers are inactive.

Figure 6:
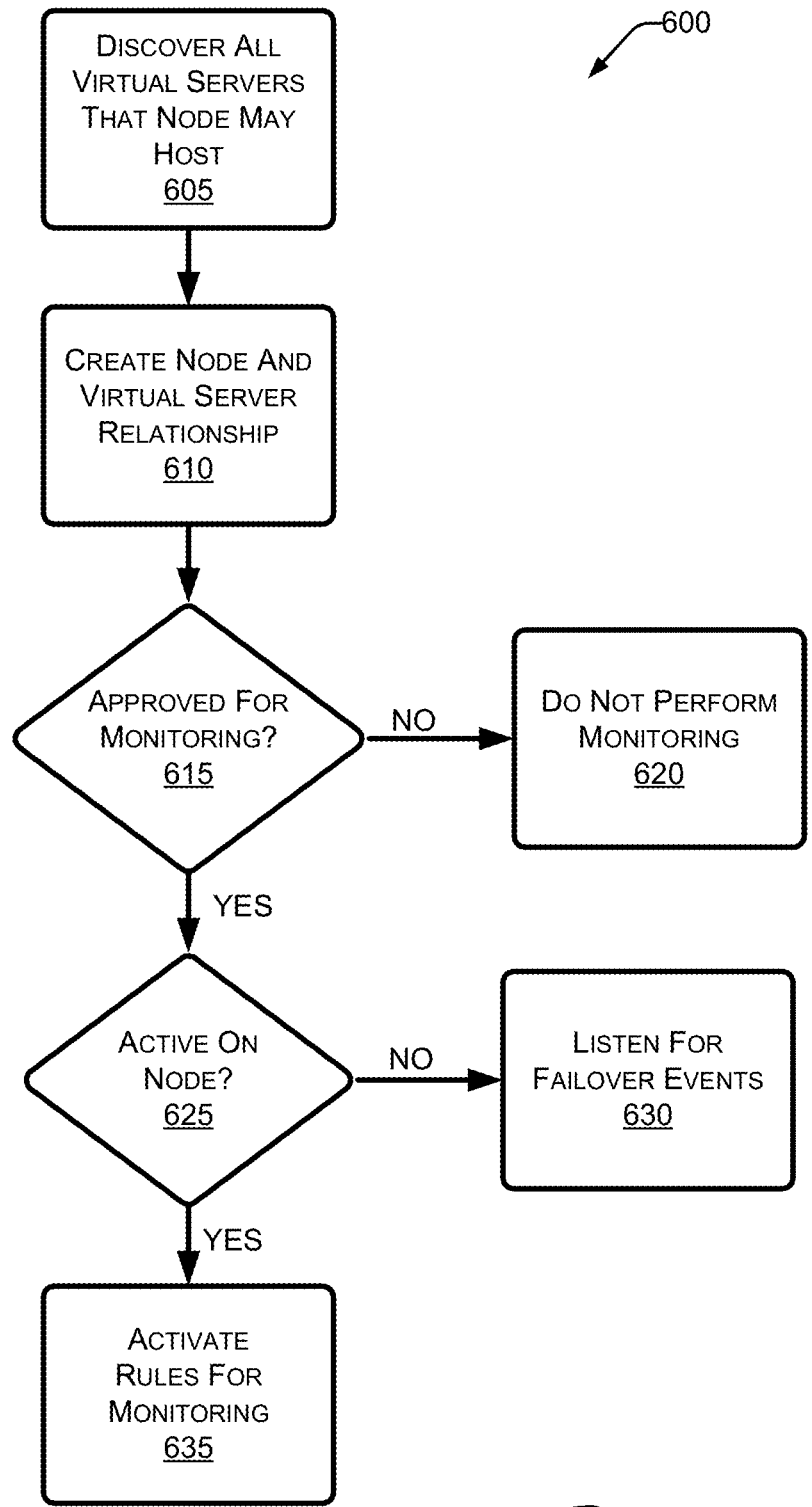
FIG. 6 is a flow diagram illustrating a process for deploying rules for monitoring to physical computers.

FIG. 6 shows a process 600 to deploy rules for monitoring physical computers. The process 600 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 600 is described with reference to physical computer 200 described above. Although described as a flowchart, it is contemplated that certain processes may take place concurrently or in a different order.

At block 605, based on data and/or application programs included in or stored by a physical computer or node in a server cluster, a determination is made as to particular virtual servers the node may host. Virtual servers are defined as providing particular services (functions) and may be identified by a network name or protocol address. The determination of virtual servers may be performed through a monitoring system agent installed on the physical computer and particularly a cluster management component resident in the monitoring system agent.

At block 610, physical computer (node) and virtual server relationships are created. The created relationships may be sent to a separate computer such as management server 135 and specifically to a management database accessed by management server 135.

An administrator/user may approve or disapprove a node to host a virtual server. Security may be one of several factors for which approval is based. If the node is not approved for monitoring (i.e., following the NO branch of block 615), at block 620 the node does not perform any monitoring. Block 620 applies to nodes that are actively hosting a virtual server and nodes that are not actively hosting a virtual server.

If the node is approved for monitoring (i.e., following the YES branch of block 615), a determination is made as to whether the node actively hosts a virtual server or does not actively host a virtual server.

If the node is not actively hosting a virtual server (i.e., following the NO branch of block 625), at block 630 the node listens for failover events through its monitoring system agent and particularly a cluster management component included in the monitoring system agent.

If the node is hosting a virtual server (i.e., following the NO branch of block 625), at block 635 the node activates rules for monitoring the virtual server and the server cluster. Such rules are created and directed by an administrator/user.

Exemplary Computer

Figure 7:
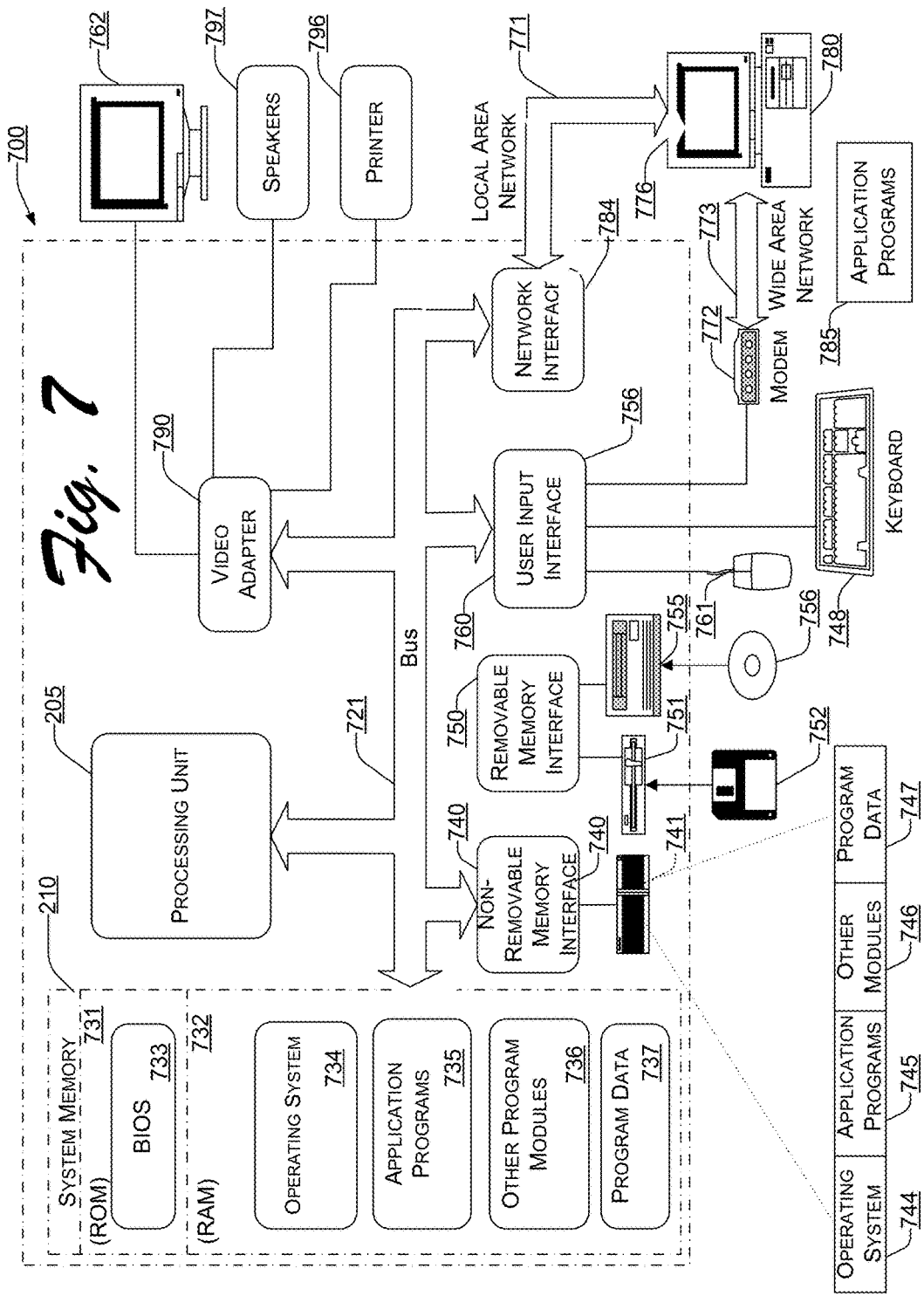
FIG. 7 is a block diagram of a detailed implementation of a computer in which identification and monitoring of virtual servers and nodes of a server cluster may be performed.

FIG. 7 shows an exemplary computing device or computer 700 suitable as an environment for practicing aspects of the subject matter, for example as physical computers 105, 110, and 200. The components of computer 700 may include, but are not limited to processing unit 205, system memory 210, and a system bus 721 that couples various system components including the system memory 210 to the processing unit 205. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Exemplary computer 700 typically includes a variety of computer-readable media. Computer-readable media can be any available media that can be accessed by computer 700 and includes both volatile and nonvolatile media, removable and non-removable media. By way of example, and not limitation, computing device-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 210 includes computing device storage media in the form of volatile and/or nonvolatile memory such as read only memory (ROM) 731 and random access memory (RAM) 732. A basic input/output system 733 (BIOS), containing the basic routines that help to transfer information between elements within computer 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737. Other program modules 736 may include monitoring system agent 215 described above.

The exemplary computer 700 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, non-volatile magnetic disk 752, and an optical disk drive 755 that reads from or writes to a removable, nonvolatile optical disk 756 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface such as interface 750.

The drives and their associated computing device storage media discussed above and illustrated in FIG. 7 provide storage of computer-readable instructions, data structures, program modules, and other data for computer 700. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the exemplary computer 700 through input devices such as a keyboard 748 and pointing device 761, commonly referred to as a mouse, trackball, or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port, or in particular a USB port. A monitor 762 or other type of display device is also connected to the system bus 721 via an interface, such as a video interface 790. In addition to the monitor 762, computing devices may also include other peripheral output devices such as speakers 797 and printer 796, which may be connected through an output peripheral interface 795.

The exemplary computer 700 may operate in a networked environment using logical connections to one or more remote computing devices, such as a remote computing device 780. The remote computing device 780 may be a personal computing device, a server, a router, a network PC, a peer device or other common network node, and typically includes many or all of the elements described above relative to computer 700, although only a memory storage device 781 has been illustrated in FIG. 7. The logical connections depicted in FIG. 7 include a local area network (LAN) 771 and a wide area network (WAN) 773, but may also include other networks such as network 120 described above. Such networking environments are commonplace in offices, enterprise-wide computing device networks, intranets, and the Internet.

When used in a LAN networking environment, the exemplary computer 700 is connected to the LAN 771 through a network interface or adapter 770. When used in a WAN networking environment, the exemplary computer 700 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the exemplary computer 700, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computing devices may be used.

CONCLUSION

The above-described methods and computers describe identifying and monitoring physical computers and virtual servers in a server cluster. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a first physical node in a server cluster that includes a plurality of different physical nodes, the method comprising:

the first physical node in the server cluster identifying one or more virtual servers that the first physical node is configured to host, based at least in part on one or more applications installed on the first physical node, wherein each physical node in the plurality of different physical nodes, including the first physical node, is configured to host the one or more virtual servers;

the first physical node and other physical nodes in the plurality of different physical nodes respectively receiving monitoring rules that are initially inactive and that, when activated, control how the server cluster is monitored;

the first physical node receiving an approval to host at least one virtual server of the one or more virtual servers, the approval being received as interface input;

the first physical node monitoring for failover events prior to receiving the approval for hosting the at least one virtual server, wherein corresponding monitoring rules for the first physical node remain inactive while the first physical node monitors for failover events;

only after the first physical node initiates hosting the at least one virtual server, the first physical node activating its corresponding previously inactive monitoring rules which are structured to control how the first physical node monitors the server cluster after receiving the approval to host the at least one virtual server, the now-active monitoring rules of the first physical node causing the first physical node to monitor the entire server cluster, wherein the other physical nodes in the plurality of different physical nodes are not hosting the at least one virtual server and still include corresponding inactive monitoring rules, and wherein the other physical nodes in the plurality of different physical nodes monitor the first physical node without monitoring the entire server cluster; and the first physical node monitoring a status of the server cluster, including the least one virtual server, in response to receiving the approval.

2. The method of claim 1, wherein the monitoring performed by the first physical node is performed based at least in part on the now-active monitoring rules.

3. The method of claim 2, wherein the now-active monitoring rules comprise one or more of:
- a frequency of monitoring the status of the least one virtual server;
- one or more conditions of the at least one virtual server on which a determination of the status of the at least one virtual server is based;
- a frequency of providing updates to a management server regarding the status of the at least one virtual server, the management server including a database storing relationships between a plurality of physical nodes and respective virtual servers hosted by the plurality of physical nodes; or
- an identification of the at least one virtual server being monitored.

4. The method of claim 1, further comprising monitoring a node status of a second physical node, the second physical node hosting one or more other virtual servers.

5. The method of claim 4, further comprising:
- identifying a failure of the second physical node based at least in part on the node status;
- performing a failover of the one or more other virtual servers from the second physical node to the first physical node; and
- hosting the one or more other virtual servers after performing the failover.

6. The method of claim 5, further comprising providing an alert to a management server after performing the failover of the one or more other virtual servers from the second physical node to the first physical node, the management server including a database storing relationships between a plurality of physical nodes and respective virtual servers hosted by the plurality of physical nodes.

7. The method of claim 6, wherein the alert comprises one or more of an indication that the failover is successfully performed or an indication that the second physical node has failed.

8. One or more computer-readable hardware storage devices having stored thereon executable instructions that are executable by one or more processors of a first physical node in a cluster that includes a plurality of different physical nodes and that cause the one or more processors of the first physical node to perform acts comprising:
- identifying one or more virtual servers that the first physical node is configured to host, based at least in part on one or more applications installed on the first physical node, wherein each physical node in the plurality of different physical nodes, including the first physical node, is configured to host the one or more virtual servers;
- the first physical node and other physical nodes in the plurality of different physical nodes respectively receiving monitoring rules that are initially inactive and that, when activated, control how the cluster is monitored;
- receiving an approval to host at least one virtual server of the one or more virtual servers, the approval being received as interface input;
- monitoring for failover events prior to receiving the approval for hosting the at least one virtual server, wherein corresponding monitoring rules for the first physical node remain inactive while the first physical node monitors for failover events;
- only after the first physical node initiates hosting the at least one virtual server, activating the first physical node's previously inactive monitoring rules which are structured to control how the first physical node monitors the cluster after receiving the approval to host the at least one virtual server, the now-active monitoring rules of the first physical node causing the first physical node to monitor the entire cluster, wherein the other physical nodes in the plurality of different physical nodes are not hosting the at least one virtual server and still include corresponding inactive monitoring rules, and wherein the other physical nodes in the plurality of different physical nodes monitor the first physical node without monitoring the entire cluster; and
- monitoring a status of the cluster, including the least one virtual server, in response to receiving the approval.

9. The one or more computer-readable hardware storage devices of claim 8, wherein the monitoring performed by the first physical node is performed based at least in part on the now-active monitoring rules.

10. The one or more computer-readable hardware storage devices of claim 9, wherein the now-active monitoring rules comprise one or more of:
- a frequency of monitoring the status of the least one virtual server;
- one or more conditions of the at least one virtual server on which a determination of the status of the at least one virtual server is based;
- a frequency of providing updates to a management server regarding the status of the at least one virtual server, the management server including a database storing relationships between a plurality of nodes and respective virtual servers hosted by the plurality of nodes; or
- an identification of the at least one virtual server being monitored.

11. The one or more computer-readable hardware storage devices of claim 8, the acts further comprising monitoring a node status of a second node, the second node hosting one or more other virtual servers.

12. The one or more computer-readable hardware storage devices of claim 11, the acts further comprising:
- identifying a failure of the second node based at least in part on the node status;
- performing a failover of the one or more other virtual servers from the second node to the first node; and
- hosting the one or more other virtual servers after performing the failover.

13. The one or more computer-readable hardware storage devices of claim 12, the acts further comprising providing an alert to a management server after performing the failover of the one or more other virtual servers from the second node to the first node, the management server including a database storing relationships between a plurality of nodes and respective virtual servers hosted by the plurality of nodes.

14. The one or more computer-readable hardware storage devices of claim 13, wherein the alert comprises one or more of an indication that the failover is successfully performed or an indication that the second node has failed.

15. A computing device comprising a first physical node in a cluster that includes a plurality of different physical nodes, the computing device comprising:
- one or more processors; and
- memory storing executable instructions that are executable by the one or more processors of the first physical node to cause the one or more processors to perform acts comprising:
  - identifying one or more virtual servers that the first physical node is configured to host, based at least in part on one or more applications installed on the first physical node, wherein each physical node in the plurality of different physical nodes, including the first physical node, is configured to host the one or more virtual servers;

the first physical node and other physical nodes in the plurality of different physical nodes respectively receiving monitoring rules that are initially inactive and that, when activated, control how the cluster is monitored;

receiving an approval to host at least one virtual server of the one or more virtual servers, the approval being received as interface input;

monitoring for failover events prior to receiving the approval for hosting the at least one virtual server, wherein corresponding monitoring rules for the first physical node remain inactive while the first physical node monitors for failover events;

only after the first physical node initiates hosting the at least one virtual server, activating the first physical node's previously inactive monitoring rules which are structured to control how the first physical node monitors the cluster after receiving the approval to host the at least one virtual server, the now-active monitoring rules of the first physical node causing the first physical node to monitor the entire cluster, wherein the other physical nodes in the plurality of different physical nodes are not hosting the at least one virtual server and still include corresponding inactive monitoring rules, and wherein the other physical nodes in the plurality of different physical nodes monitor the first physical node without monitoring the entire cluster; and monitoring a status of the cluster, including the least one virtual server, in response to receiving the approval.

16. The computing device of claim 15, wherein the now-active monitoring rules comprise one or more of:

a frequency of monitoring the status of the virtual server;

one or more conditions of the virtual server on which a determination of the status of the virtual server is based;

a frequency of providing updates to a management server regarding the status of virtual server, the management server including a database storing relationships between a plurality of computing devices and respective virtual servers hosted by the plurality of computing devices; or an identification of the at least one virtual server being monitored.

17. The computing device of claim 15, the acts further comprising monitoring a status of a second computing device, the second computing device hosting one or more other virtual servers.

18. The computing device of claim 17, the acts further comprising:

identifying a failure of the second computing device based at least in part on the status of the second computing device;

performing a failover of the one or more other virtual servers from the second computing device to the computing device; and hosting the one or more other virtual servers after performing the failover.

19. The computing device of claim 18, the acts further comprising providing an alert to a management server after performing the failover of the one or more other virtual servers from the second computing device to the computing device, the management server including a database storing relationships between a plurality of computing devices and respective virtual servers hosted by the plurality of computing devices.

20. The computing device of claim 19, wherein the alert comprises one or more of an indication that the failover is successfully performed or an indication that the second computing device has failed.

* * * * *